United States Patent

[11] 3,544,013

[72] Inventor Daniel Dorfman
Woodbury, New York
[21] Appl. No. 866,428
[22] Filed Oct. 7, 1969
Continuation of Ser. No. 558,307,
June 17, 1966, abandoned.
[45] Patented Dec. 1, 1970
[73] Assignee Lawn-A-Mat Chemical & Equipment Corporation
Mineola, New York
a corporation of New York

[54] SOIL TREATING APPARATUS
2 Claims, 6 Drawing Figs.
[52] U.S. Cl..................................................... 239/656;
111/11; 222/145
[51] Int. Cl...................................................... A01c 7/06

[50] Field of Search............................................ 111/8, 9,
10, 11, 73; 239/656, 661, 672; 222/145

[56] References Cited
UNITED STATES PATENTS

| 841,982 | 1/1907 | Jordan et al. | 111/73 |
| 2,550,872 | 5/1951 | Shaw | 239/661X |
| 3,419,221 | 12/1968 | Fyrk | 239/656 |

*Primary Examiner*—Robert E. Bagwill
*Assistant Examiner*—Stephen C. Pellegrino

ABSTRACT: A complete soil treating apparatus including means for distributing particulate material, means to pierce the soil to loosen and aerate the same and means to distribute liquids, said details being operated by a drive transmission of the apparatus as the same moves over and relative to the soil.

Patented Dec. 1, 1970

INVENTOR
DANIEL DORFMAN
BY
ATTORNEYS.

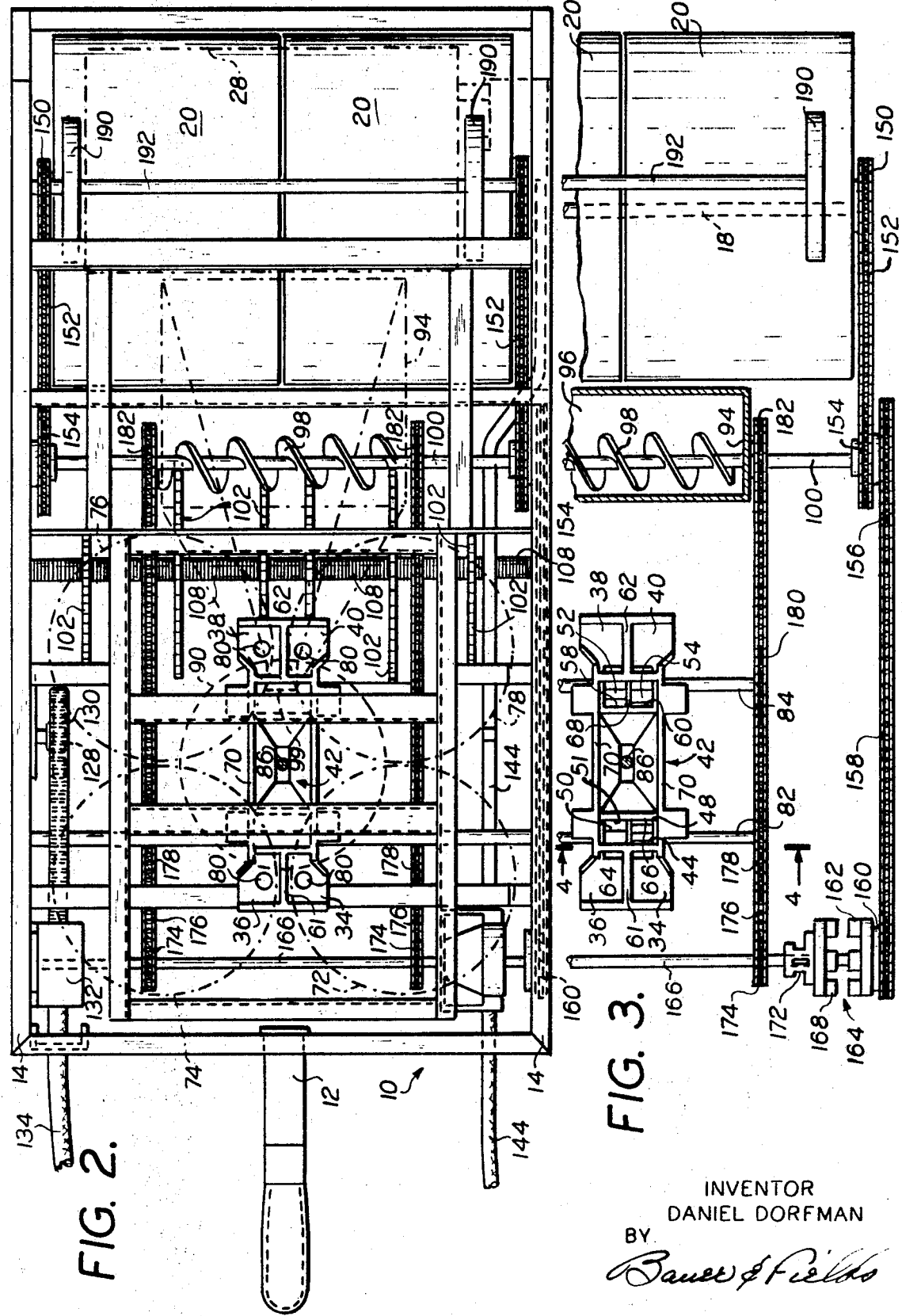

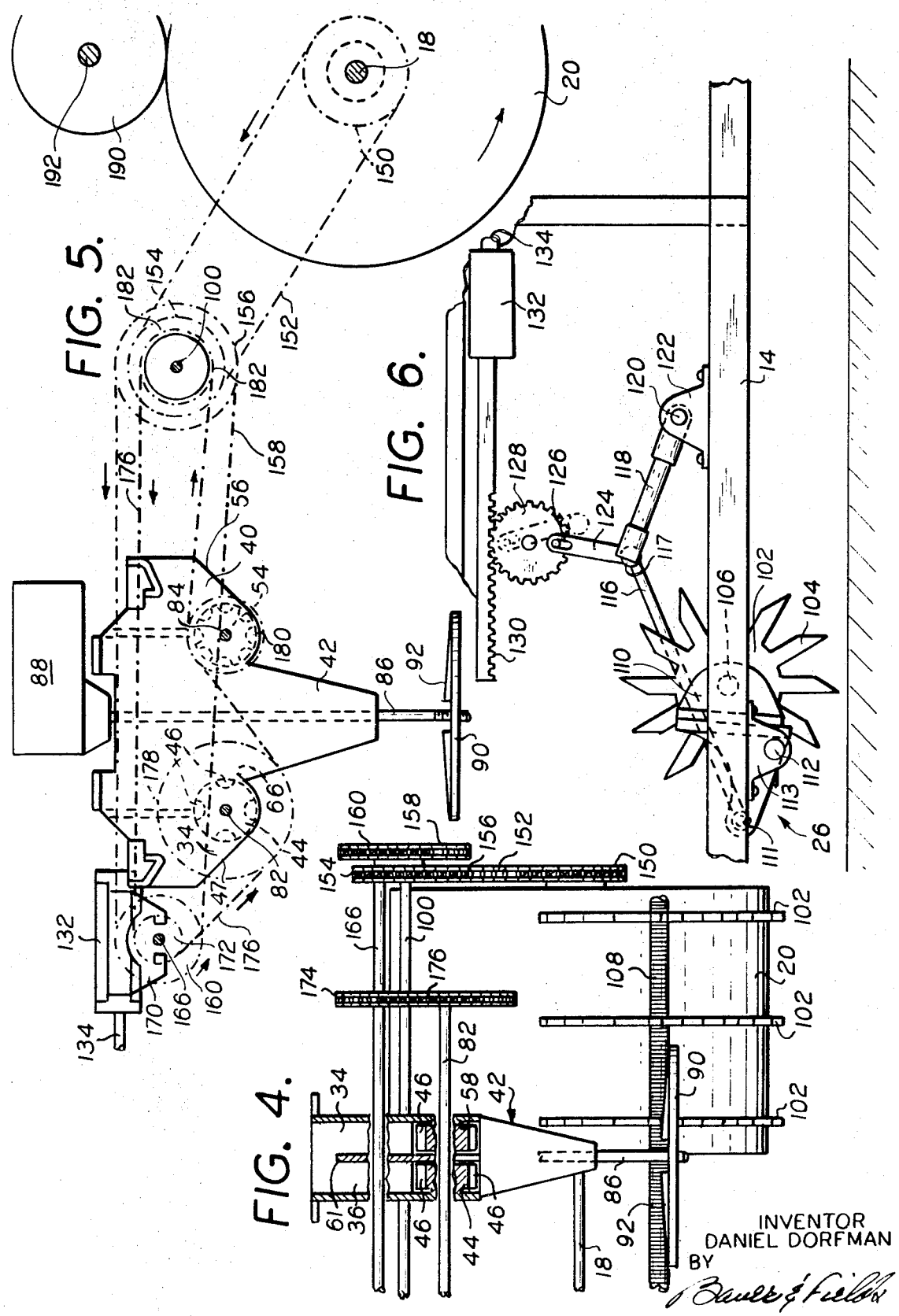

3,544,013

SOIL TREATING APPARATUS

This is a continuation of application Ser. No. 558,307, filed June 17, 1966, now abandoned.

The present invention relates to soil-treating apparatus.

In particular, the present invention relates to apparatus of the type which is adapted to treat lawns and the like. In the treatment of soil of this type it is generally necessary to apply to the soil a number of different types of materials so as to properly prepare the soil for the growing of grass, for example. Many of these different materials are in particulate form, while others are in liquid form, and in addition to those materials it is of course necessary to provide the soil with suitable seed as well as to place the soil in a suitable physical condition, as by piercing soil which is too dense so that it will become looser.

At the present time, various pieces of equipment are required to carry out all of these operations, rendering the soil treatment time consuming and expensive.

It is therefore a primary object of the present invention to provide a soil-treating apparatus which can very extensively treat the soil with a wide variety of treatments during a single operation, so that the time and costs are both reduced, while at the same time enhancing the quality of the soil treatment.

Thus, it is one of the objects of the present invention to provide a soil-treating apparatus which is capable of simultaneously delivering to the soil a plurality of different materials in particulate form.

Also, it is an object of the present invention to provide an apparatus which will maintain all of the various particulate materials which are delivered to the soil at predetermined quantitative relationships one with respect to the other, in a fully automatic manner.

Furthermore, it is an object of the present invention to provide a soil-treating apparatus which can deliver to the soil liquid treating material as well as particulate treating material, both the liquid and the particulate materials being simultaneously delivered with the apparatus of the invention.

In addition, it is an object of the invention to provide an apparatus which is capable not only of simultaneously treating the soil with both different particulate materials and at least one liquid material, but which in addition is capable of simultaneously aerating the soil, as by piercing it with suitable piercing elements, and which in addition is also capable of simultaneously delivering seed to the soil to be compacted into the upper surface portion of the soil simultaneously with the treatment of the soil, so that all of the operations can be very quickly and effectively carried out.

The objects of the present invention also include an apparatus which is capable of taking advantage of the pulling power provided for pulling the apparatus, by a tractor or the like, so that at least a part of this pulling power is used for the distribution of the various materials to the soil.

Thus, in accordance with the invention the apparatus includes a plurality of containers for different particulate treating materials and a single discharge means adapted to receive all of these materials from the plurality of containers. A plurality of conveyor means respectively communicate with the plurality of containers for conveying the different materials therefrom to the single discharge means, and in accordance with the invention the plurality of conveyor means maintain the materials respectively conveyed thereby at substantially constant predetermined fractions of the total material discharged by the single discharge means. This latter structure of the invention is carried by a suitable frame means which is operatively connected with rollers which roll along and compress the soil, and this frame means is adapted to be drawn by a tractor or the like. According to a further feature of the invention the drive for the plurality of conveyor means is taken directly from the rollers during rotation thereof, and also in accordance with the invention these rollers are used as a source of power for other units carried by the frame means and requiring a drive for their operation. These additional units include a pump which pumps a liquid from a tank, carried by the frame means, along a suitable conduit to be distributed therefrom to the ground, and furthermore the frame means carries a seed-distributing unit in which is located a rotary stirrer for stirring the seeds, this stirrer also being driven directly from the rollers, so that in this way advantage is taken of the pulling power to use some of this power for driving various units carried by the frame means. The frame means additionally carries a soil-piercing means capable of being displaced, at the option of the operator, to and from an operating position for piercing the ground in response to movement of the frame means along the ground. The structure of the invention further includes a manually operable clutch for starting and stopping the drive of at least some of the units driven from the soil-compressing rollers.

The invention is illustrated by way of example in the accompanying drawings which form part of this application and in which:

FIG. 2 is a top plan view of the structure of FIG. 1 showing in dot-dash lines containers which are shown in solid lines in FIG. 1, so that in this way the structure beneath these containers will be more clearly illustrated;

FIG. 3 is a sectional plan view taken beneath the plane of FIG. 2 and showing further details of the structure, FIG. 3 fragmentarily illustrating one side of the apparatus;

FIG. 4 is a fragmentary transverse section taken along line 4—4 of FIG. 3 in the direction of the arrows;

FIG. 5 is a schematic side elevation illustrating the drive transmission of the invention; and FIG. 6 is a fragmentary side view of the apparatus, as seen from the side thereof which is not visible in FIG. 1 and illustrating the structure for actuating the soil-piercing unit, this unit being shown in its upper retracted position in FIG. 6 and in its lower operating position in FIG. 1.

GENERAL ORGANIZATION

Figure 1:
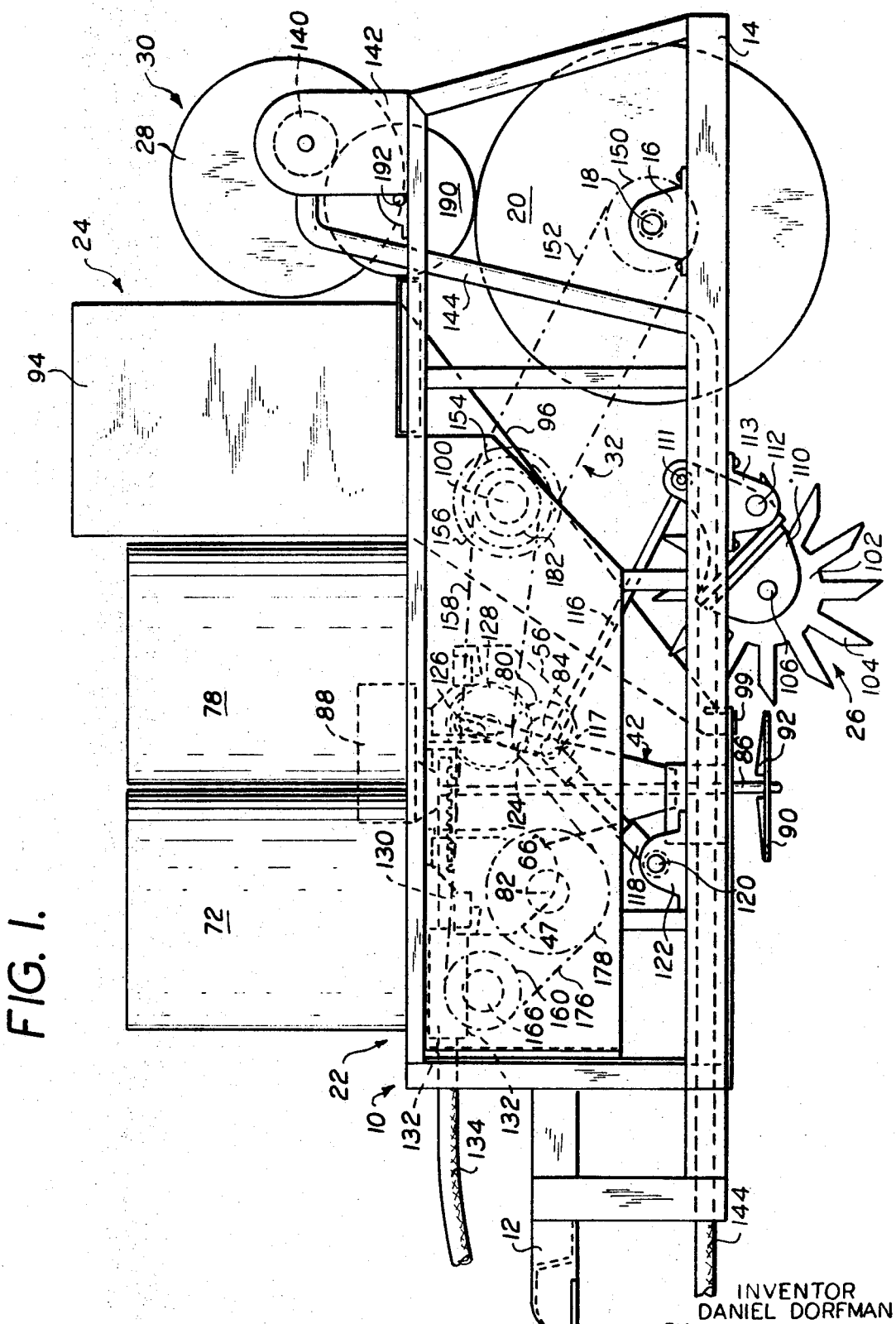
FIG. 1 is a partly schematic side elevation of one possible embodiment of a soil-treating apparatus according to the invention.

Referring to FIGS. 1 and 2, the soil-treating apparatus of the invention illustrated therein includes a frame means 10 made up of an assembly of angle irons or other rigid bars and the like, all of which are welded or otherwise joined to each other so as to form a rigid framework supporting the various components of the apparatus of the invention. At its front end the frame means 10 is operatively connected with a hitching bar 12 of conventional construction capable of being hitched to the rear end of a tractor, for example, so that in this way during travel of the tractor the apparatus will be pulled along the ground.

The frame means 10 includes lower horizontal bars 14 which adjacent their rear ends fixedly carry brackets 16 which carry a transverse shaft 18 extending transversely across the frame means. This shaft 18 extends through a pair of rollers 20 which are situated in side by side relation between the side frame members 14 extending downwardly below the latter so as to engage and rest on the soil. These rollers 20 are relatively massive, heavy rollers which by engaging the ground will compact and smooth the soil during pulling of the frame means 10 therealong.

This frame means 10 is maintained at the substantially horizontal attitude shown in FIG. 1 by the connection of the hitching bar 12 with the rear end of the tractor. When the hitching bar 12 is not connected to the tractor the entire frame means 10 with all of the structure carried thereby can turn around the shaft 18 in a counterclockwise direction, as viewed in FIG. 1, so that the front lower end of the frame means 10 can than engage the ground. In order to attach the apparatus to a tractor the hitching bar 12 is raised approximately to the elevation shown in FIG. 1 and is connected in a conventional manner to the rear end of the tractor.

The frame means 10 carries, in the region of its front end, a material distributing means 22 which distributes particulate material in a manner described below. Behind the distributing means 22 for the particulate material is situated a seed-distributing means 24 adapted to hold a supply of seeds which are evenly distributed onto the ground just in advance of the rollers 20 by a rotating plate to be described. Situated just in front of the seed-distributing means 24 is a soil-piercing means 26 which is adapted to pierce the soil so as to aerate the same, also in a manner described below. The frame means 10 carries at its rear end a liquid-distributing means 30 which includes a tank 28 for a liquid which is to be distributed onto the soil. This liquid is delivered to the soil in a manner described in greater detail below. The above units, namely, the particulate material distributing means 22, the seed-distributing means 24, the soil-piercing means 26 and the liquid-distributing means 30, are all driven by a transmission means 32, the details of which are described below.

MEANS FOR DISTRIBUTING PARTICULATE MATERIAL

In the particular example illustrated, the distributing means 22 is capable of simultaneously distributing four different materials. Referring to FIGS. 2—4, the four different materials are adapted to be respectively received in four containers 34, 36, 38 and 40 which are in the form of hoppers down which the particulate material is adapted to slide by gravity to the lower outlet ends of these hoppers. A single discharge means 42 is adapted to discharge all of the materials. All of the containers 34, 36, 38 and 40, together with the discharge means 42 can be formed from a single unitary casting.

The discharge means 42 is simply in the form of a downwardly tapered tubular enclosure having an open top end as well as an open bottom end, and this tubular enclosure is of a substantially rectangular configuration in horizontal section so that the open top end as well as the open bottom end of the discharge means 42 are of rectangular configuration, as shown most clearly in FIG. 3. The sidewalls of the discharge means 42 are thus inclined inwardly and downwardly from the open top end to the open bottom end of the discharge means 42.

Between the containers 34, 36, 38 and 40 and the single discharge means 42, the outlet ends of these containers have the configuration of guides which extend in part along cylinders, forming hollow cylindrical guides for a plurality of rotary conveyor means which respectively convey the particulate materials from the several containers to the single discharge means 42. It is a characteristic of the plurality of conveyor means of the invention that they will automatically maintain the several materials at substantially constant fractions of the total material discharged by the discharge means 42. In this way a predetermined quantitative relationship between the several materials is automatically maintained with the apparatus of the invention.

The conveyor means which communicates with the container 34 is in the form of a rotary body 44 of circular cross section having its periphery formed with cutouts 46 (FIG. 4) which thus form buckets for receiving the particulate material from the container 34. This rotary body 44, which resembles a gear in its exterior appearance, turns in a counterclockwise direction, as viewed in FIG. 5, so that the particulate material which slides by gravity downwardly along the left wall 47 of the container 34, toward the right, as viewed in FIG. 5, will enter into the buckets 46. By cooperation of these buckets with the cylindrical guide formed by the bottom end of the container 34 the material in the buckets will be raised to the outlet 48 situated at the inlet end of the discharge means 42. As is apparent from FIG. 3, this outlet 48 is simply in the form of a rectangular opening formed in the guide wall which is of a configuration forming part of a cylinder in which the rotary body 44 is guided for rotary movement.

In the same way, a rotary body 50 forms the conveyor means communicating with the container 36, and this rotary body 50 is also guided by a guide which extends along part of a cylinder and which is formed with a rectangular outlet opening 51 through which the material discharges from the buckets, formed by cutouts in the periphery of the rotary body 50, into the discharge means 42.

In much the same way a pair of rotary bodies 52 and 54 are respectively guided for rotation in the cylindrical guides situated at the outlet ends of the containers 38 and 40 respectively. Referring to FIG. 5, the pair of rotary bodies 52 and 54 turn in a clockwise direction, as viewed in FIG. 5, and the material in the containers 38 and 40 slides down the lower inclined wall 56 which is inclined downwardly toward the left, as viewed in FIG. 5, so that in this way the material reaches the buckets formed by the cutouts at the outer peripheries of the rotary bodies 52 and 54. Returning now to FIG. 3, it will be seen that the cylindrical guides for the rotary bodies 52 and 54 are respectively formed with the outlet openings 58 and 60 through which the material discharges from the buckets of the bodies 52 and 54 into the discharge means 42.

As was indicated above, the containers 34, 36, 38 and 40 together with the discharge means 42 are in the form of a single casting. This single casting also includes the integral cylindrical guides for the rotary bodies. The single unitary casting has a partition wall 61 separating the container 34 from the container 36 and a similar partition wall 62 (FIG. 3) separating the container 38 from the container 40. The partition 61 has an integral extension 64 situated between the bodies 44 and 50 and defining the adjacent edges of the discharge openings 48 and 51 to which the material is delivered from the rotary bodies 44 and 50 respectively. These discharge openings have bottom edges 66, and the elevation of the bottom edge 66 is indicated in FIG. 5, so that it is clear that the material in the buckets of the rotary bodies will simply drop out of the latter and downwardly along the discharge means 42. In the same way the partition 62 has an integral extension 68 situated between and separating the rotary bodies 52 and 54.

The discharge means 42 together with the containers 34, 36, 38 and 40 have a common upper surface 70 located in a single horizontal plane, and on this upper surface rests a plurality of supply containers which hold the material to be delivered to the containers 34, 36, 38 and 40. These supply containers 72, 74, 76 and 78 are shown in dot-dash lines in FIG. 2. They have offset outlet openings 80 which are respectively alined with the several containers 34, 36, 38 and 40, as shown most clearly in FIG. 2. The upper surface 70 is flush with the upper surface of the frame means 10, and the several enclosures 72, 74, 76 and 78 simply rest on these surfaces and can be clamped thereon in any suitable way with the outlets 80 respectively communicating with and situated over the several containers 34, 36, 38, and 40, as indicated in FIG. 2. The outer end walls of the latter containers are common walls which form extensions of each other, so that the downwardly inclined wall 47 shown in FIG. 5 also extends across the lower front portion of the container 36, while the downwardly inclined wall 56 extends downwardly across the lower right portion of the container 38.

The pair of conveyor means 44 and 50 are fixedly mounted on a common drive shaft 82, while the pair of conveyor means 52 and 54 are fixedly carried by a common drive shaft 84. Thus, the conveyors 44 and 50 will necessarily have the same speed of rotation, and the conveyors 52 and 54 which is different from that of conveyors 44 and 50, as pointed out below, have the same speed of rotation. However, the size of the buckets formed in the periphery of the conveyor 50 may be different from the size of the buckets 46 formed in the periphery of the conveyor 44, and in the same way the size of the buckets formed in the periphery of the conveyor 52 may be different from the size of all the other buckets, while the size of the buckets of the conveyor 54 also may be different from the size of all the other buckets. In addition, the shafts 82 and 84 are maintained at speeds of rotation which have a predetermined relationship with respect to each other.

As a result of these features a predetermined substantially constant quantitative relationship will be maintained between the several materials delivered to the single discharge means 42. Thus, although the conveyors 44 and 50 rotate at the same speed, the different sizes of their buckets will maintain a given quantitative relationship between the materials in the containers 34 and 36. Also, the different size of the buckets of the conveyor 52 as compared to those of the conveyor 54 will maintain a given quantitative relationship between the materials conveyed from the containers 38 and 40. On the other hand, the predetermined speeds of rotation of the shafts 82 and 84 will provide for the materials conveyed by the conveyors 44 and 50 a given quantitative relationship with respect to the materials conveyed by the conveyors 52 and 54. Thus, both by the speed of rotation of the shaft 82 as contrasted with the speed of rotation of the shaft 84, as well as by the construction of the conveyors themselves, it is possible to maintain in a fully automatic manner a predetermined quantitative relationship between the several materials all of which discharge through the discharge means 42. In this way the structure of the invention is capable of maintaining, through the several conveyor means of the invention, all of the materials respectively conveyed thereby at predetermined substantially constant fractions of the total material which is discharged by the discharge means 42.

FIG. 1 shows the containers 72 and 78 mounted on the frame, and of course the containers 74 and 76 are situated behind the containers 72 and 78, respectively, as viewed in FIG. 1.

Because of the relatively small size of the bottom outlet end of the single discharge means 42, it is advisable to provide a structure for broadcasting and spreading the particulate material dropping from the discharge means 42, before this material reaches the ground. For this purpose a rotary shaft 86 extends downwardly through the discharge means 42 along its vertical axis. This rotary shaft 86 is driven by a motor and transmission unit 88 which is mounted on the frame over the discharge means 42 between the containers 72, 74, 76 and 78 in the manner shown most clearly in FIG. 5. This unit 88 can be any suitable electric motor driven from the battery of the tractor, for example, and through a suitable transmission it rotates the shaft 86 at a given speed. The containers 72, 74, 76 and 78 have in the region of the unit 88 a configuration which clears and accommodates this unit.

At its bottom end, which is situated beneath the lower outlet opening of the discharge means 42, the shaft 86 fixedly carries a flat rotary disk 90 situated in a plane which is substantially horizontal and perpendicular to the axis of the discharge means 42. At its upper face the plate 90 carries suitable radially disposed ribs 92. With this construction the material dropping from the discharge means 42 will be received on the upper face of the rotating plate 90, which as a result of its rotation and as a result of guiding derived from the ribs 92, will centrifugally throw and evenly distribute the particulate material across the soil beneath the frame means 10 in advance of the rollers 20. In this way, the several materials which are maintained at a given quantitative relationship with respect to each other in the manner described above are distributed on the soil over a relatively large area beneath the frame means 10. The rate at which the material is delivered to the disk 90 and the speed of rotation thereof are designed so that the material will be thrown across a path having a width in excess of the width of the frame means 10. Therefore, as the frame means 10 is guided in several passes back and forth across the soil, a thorough uniform distribution of the materials will be provided, with each pass of the frame across the soil resulting in an equal overlapping and even broadcast of material at least partially covering that laid down during the prior pass.

SEED-DISTRIBUTING MEANS

The frame means 10 carries behind the containers 76 and 78 the seed-distributing means 24 in the form of a suitable container 94 (FIG. 1) into which the seed can be supplied. This container 94 has a lower inclined wall 96 (FIG. 1) which is inclined forwardly and downwardly and which communicates with an outlet opening 99 which is positioned immediately above the rotating plate 90 to assure even and thorough broadcast of seeds onto the ground by the rotating plate. To facilitate the movement of the seeds from the container 94, its transversely spaced sides and wall opposite the wall 96 all converge towards the outlet opening 99 as shown in FIGS. 1 and 2. The outlet opening 99 may be covered and uncovered by a covering element (not shown) to control the dispensing of material from the container 94. Furthermore, as is shown in FIGS. 2 and 3, there is situated in the region of the bottom end and transversely of the container 94, a rotary screw member 98 which forms a stirrer which continuously loosens the seeds which flow by gravity to the bottom outlet of the container 94. This rotary screw stirrer 98 is fixedly carried by a rotary shaft 100 which extends through the side walls of the container 94 outwardly beyond the latter to the opposite sides of the frame 10.

Thus, as the frame 10 is advanced along the ground not only can several materials be distributed to the ground by the material distributing means 22, but in addition seed can be distributed from the container 94. The manner in which the shafts 82, 84 and 100 are driven is described in greater detail below.

SOIL-PIERCING MEANS

As has been indicated above, the frame means 10 of the invention also carries a soil-piercing means 26 which is situated at a lower part of the frame just in back of the bottom outlet end 99 of the seed-distributing means 24. This piercing means 26 includes a plurality of disks 102 spaced transversely along the width of the frame 10 and which have at their peripheries relatively sharp, pointed fingers 104 forming ground-piercing blades which are capable of entering into and moving out of the ground during rolling of the disks 102 in response to advance of the frame means 10 when it is pulled by the tractor. In this way, when the piercing means 26 operates it is capable of loosening and aerating soil which has become compacted to an undesirable extent.

The several disks 102 are loosely mounted on a shaft 106, and between the several disks 102 are located coil springs 108 (FIGS. 2 and 4) which are coiled about shaft 106. Thus, while these springs 108 serve as yieldable spacers maintaining the toothed disks 102 at predetermined transverse distances from each other, nevertheless in response to obstructions encountered by the teeth or fingers 104 these disks 102 can yield due to their loose mounting of the shaft 106, the springs 108 giving way for this purpose and then acting to return the several ground-piercing disks 102 back to their initial positions.

The ends of the shaft 106 are respectively mounted in bracket 110 which is pivotally mounted on a pin 112 carried by a bracket 113 extending downwardly from the horizontal side frame members 14, as indicated in FIG. 1. FIG. 6 shows the pin 112 and bracket 110 at the side of the apparatus opposite from that shown in FIG. 1.

The bracket 110 of FIG. 6 has distant from the shaft 106 a pivotal connection 111 with a link 116, and this link is in turn pivotally connected at 117 with a rocker arm 118 which is pivoted on a pin 120 carried by a bracket 122 on the side bar 14, shown in FIG. 6. The one bracket 110 of FIG. 6 is duplicated on the reverse hand to the other bracket 110 at the side of the apparatus which is shown in FIG. 1. At the side of the apparatus shown in FIG. 6 the pivot pin 117 which interconnects the links 116 and 118 is also connected to an elongated rod 124 having a slotted portion receiving a pin 126 eccentrically carried by a rotary pinion 128, so that the pin 126 acts as a crank pin.

During rotation of the pinion 128, which is supported for rotation by any suitable bearing structure carried by the frame means 10, the link 124 will be pulled up to the dotted line position shown in FIG. 6, causing the pair of arms 116 and 118 also to be pulled up, and the parts are shown in this upper position in FIG. 1. The result is that the bracket 110 swings in a clockwise direction about the pin 112, as viewed in FIG. 6. The bracket 110 of FIG. 1 will turn in a counterclockwise direction about the pin 112 down to the position shown in FIG. 1 at the same time that the bracket 110 turns in FIG. 6, and of course these brackets will remain in alinement with each other. When the pinion 128 is turned so as to situate the bar 124 at the position shown in solid lines in FIG. 6, the piercing means will be retracted to its upper inactive position shown in FIG. 6.

In order to actuate the piercing means the pinion 128 meshes with an elongated rack 130 supported for longitudinal movement by any suitable guides and situated at one side of the frame 10 adjacent its front end, as indicated at the upper left portion of FIG. 2. A hydraulic piston-and-cylinder assembly 132 is carried by the frame 10 and is operatively connected with one end of the rack 130 for longitudinally displacing the rack in response to introduction and withdrawal of the hydraulic liquid into and out of the cylinder of the assembly 132. A hydraulic pressure conduit 134 extends from the unit 132 to the tractor where it has a releasable connection with a valve communicating with a source of liquid under pressure and capable of being actuated by the operator so as to advance or retract the piercing means 26 to or from its operating position.

LIQUID-DISTRIBUTING MEANS

As has been indicated above, the frame means 10 carries at its rear end a liquid distributing means 30 which includes a tank 28 for a liquid which is to be distributed. This tank 28 can be supplied with liquid from any suitable source. As shown at the upper right portion of FIG. 1, in a schematic manner, a pump 140 carried by a suitable support 142, which is mounted on the frame 10, communicates with the interior of the tank 28 to withdraw the liquid therefrom, and this liquid is delivered under pressure to a conduit 144 through which the liquid under pressure flows from the pump 140 toward the front of the tractor. Thus, the drawings show the conduit 144 extending forwardly beyond the front end of the frame means 10, and this conduit 144 terminates in the region of a suitable part of the tractor in a spray head from which the liquid is sprayed across the path covered by the tractor and the apparatus of the invention. Thus, when the apparatus of the invention is attached to the tractor, not only is the hitching part 12 connected to a rear end of the tractor, but in addition, the pressure conduit 134 is connected with the valve of the source of hydraulic liquid under pressure and the conduit 144 is connected with the spray head which is carried by the tractor. The tank 28 is indicated in dot-dash lines in FIG. 2.

DRIVE TRANSMISSION

With the exception of the rotary disk 90, which receives its own drive from the motor-transmission assembly 88, as described above, all of the several units carried by the frame means 10 are driven from the rollers 20 in response to rotary movement thereof. For this purpose the pair of rollers 20 fixedly carry at their outer end walls a pair of coaxial sprocket wheels 150 which respectively mesh with a pair of endless chains 152 situated at the opposite sides of the frame. These chains 152 extend around sprocket wheels 154 fixedly mounted on the rotary shaft 100, so that in this way there is a direct transmission of the drive to the shaft 100 so as to rotate the seed-stirring screw 98.

At the side of the apparatus which is shown in FIG. 3, the shaft 100 carries an additional sprocket 156 which is fixed to the shaft 100 for rotation therewith, and this sprocket 156 meshes with an endless chain 158. This chain 158 extends along one side of the frame and is received on a front sprocket 160 which is fixed with one half 162 of a dog clutch 164. The unit 160, 162 is freely turnable on a transverse shaft 166 which extends across the front of the frame and which is supported for rotation by any suitable bearing structure. The other half 168 of the dog clutch 164 is slidably keyed on the shaft 166, and a shifting fork 170, diagrammatically indicated in FIG. 5, extends into the groove 172 of the shiftable clutch member 168 so that the operator at the rear end of the tractor can easily reach the shifting fork 170, which has a suitable lever accessible to the operator. The shifting of the fork 170 along the shaft 166 will displace the clutch half 168 into or out of engagement with the clutch half 162. The clutch half 162 of course rotates continuously as long as the rollers 20 turn, but the rotation is transmitted to the shaft 166 only when the clutch half 168 is shifted into engagement with the clutch half 162.

The shaft 166 carries a pair of sprocket wheels 174 (FIGS. 2 and 3) which mesh with a pair of endless chains 176 situated on opposite sides of the material distributing means 22. These chains 176 respectively extend around the undersides of a pair of relatively large sprockets 178 fixedly carried by the shaft 82, and the chains 176 respectively extend upwardly from the sprocket 178 and over the top of a pair of sprockets 180 which are fixedly carried by the shaft 84 and which are of a smaller diameter than the sprockets 178. These chains 176 then extend from the top ends of the sprockets 180 around a pair of sprockets 182 which are freely turnable on the shaft 100 and which are prevented from shifting axially therealong by any suitable collars or the like. The endless chains 176 then extend from the upper part of the sprockets 182 horizontally back to the upper parts of the sprockets 174. Thus, it will be seen that with this transmission the shaft 84 will necessarily be turned at a higher speed of rotation than the shaft 82 so that in this way part of the quantitative relationship between the several materials delivered by the material distributing means 22 is achieved. Of course, the drive is transmitted to the shafts 82 and 84 only when the clutch 164 is engaged, and this drive can be interrupted whenever the clutch is disengaged. At the same time it will be noted that the drive for the shaft 100 is dependent on the drive for distributing means 22, so that the clutch 164 controls the material distributing means 22 and also the seed-distributing means 24.

The drive for the pump 140 is achieved from a pair of friction wheels 190 which frictionally engage the rollers 20 at their upper surface portions. These friction wheels 190 are fixed to a shaft 192 supported in suitable bearings for rotary movement, these bearings being connected to the frame 10 in the manner shown most clearly in FIG. 1. Thus, the friction wheels 190 will both act to turn the shaft 192, and the wheel 190 which is visible in FIG. 1 frictionally cooperates with a drive wheel for the pump 140 so as to rotate an impeller or rotor thereof and thus produce the pumping action.

Therefore, with the drive transmission 32 of the present invention, the pump 140 will be driven whenever the rollers 20 turn, and a suitable valve at the spray head connected to the front end of the conduit 144 can be actuated by the operator for controlling the spray of liquid. The wheel 190 shown in FIG. 1 can through a suitable transmission rotate an impeller of a centrifugal pump which forms the pump 140, so that this impeller can simply turn freely even though liquid is prevented from discharging from the conduit 144. A suitable safety valve may be provided for limiting the pressure. Also, whenever the rollers 20 turn the seed stirrer 98 turns.

Furthermore, whenever the rollers 20 turn the clutch half 162 turns, and by displacing the clutch half 168 into or out of engagement with the clutch half 162 the operator has the option of setting the material distributing means 22 into or out of operation. Furthermore, the operator can actuate the cylinder and piston means 132 in order to displace the soil-piercing means 26 into or out of its lower operating position shown in FIG. 1.

Thus, with this relatively simple, compact structure of the invention it is possible to achieve a wide variety of treatments all taking place simultaneously in a precisely determined manner, with a considerable part of the energy derived from the pulling of the apparatus utilized not only for pulling the apparatus along the soil, so that it would be compacted by the rollers 20, but in addition for the purpose of driving the various components in the manner described above. By situating the rollers 20 at the rear of the apparatus the last operation is a smoothing and compacting of the soil.

I claim:

1. A soil-treating apparatus comprising a frame, at least two adjacent storage units for materials in particulate form supported on said frame, said storage units having depending outlets therefrom bounding a clearance space therebetween, a common discharge member for said particulate materials formed by an outer wall bounding an unencumbered vertical passageway having an inlet opening and an outlet opening at opposite ends, means supporting said discharge member on said frame in a depending position from said clearance space, conveyor means arranged between said common discharge member inlet opening and said storage unit outlets so as to be operatively effective to convey a quantity of particulate materials from said storage units into said common discharge member, and particulate material distributing means including a motor operatively arranged within said clearance space above said common discharge member inlet opening, a depending drive shaft from said motor disposed in unencumbered relation longitudinally of said vertical passageway of said common discharge member so as to effect circumferential movement of said particulate materials in response to rotation of said drive shaft simultaneous with gravity movement of said particulate materials through said vertical passageway, and a scattering plate fixedly mounted on said shaft in facing relation to said discharge member outlet opening, whereby said shaft rotation operates said scattering plate to effect distribution of said particulate materials and also contribute to mixing thereof within said vertical passageway of the common discharge member preparatory to said distribution.

2. The combination in a soil-treating apparatus as defined in claim 1 wherein additional storage units are arranged adjacent said two storage units in circumferential relation to said discharge station.

Disclaimer 3,544,013.—*Daniel Dorfman*, Woodbury, N.Y. SOIL TREATING APPARATUS. Patent dated Dec. 1, 1970. Disclaimer filed Aug. 6, 1971, by the assignee, *Lawn-A-Mat Chemical & Equipment Corporation*.
Hereby enters this disclaimer to all of the claims of said patent.
[*Official Gazette November 2, 1971.*]